US012288450B1

(12) United States Patent
Yepez et al.

(10) Patent No.: US 12,288,450 B1
(45) Date of Patent: Apr. 29, 2025

(54) MODULAR SELF-SERVICE CHECKOUT SYSTEM

(71) Applicant: NCR Voyix Corporation, Atlanta, GA (US)

(72) Inventors: Rafael Yepez, Duluth, GA (US); Brian Whiteside, Atlanta, GA (US); Mark Johnson, Atlanta, GA (US); Philip Noel Day, Fife (GB); Kimberly Wang, Atlanta, GA (US); Ajit Cotha, Atlanta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 17/902,462

(22) Filed: Sep. 2, 2022

Related U.S. Application Data

(60) Provisional application No. 63/240,599, filed on Sep. 3, 2021.

(51) Int. Cl.
*G07G 1/00* (2006.01)
*A47F 9/04* (2006.01)
*G07G 1/01* (2006.01)

(52) U.S. Cl.
CPC ............. *G07G 1/0018* (2013.01); *A47F 9/04* (2013.01); *G07G 1/01* (2013.01)

(58) Field of Classification Search
None
See application file for complete search history.

(56) References Cited

U.S. PATENT DOCUMENTS

| | | | | |
|---|---|---|---|---|
| 6,062,478 A | * | 5/2000 | Izaguirre | G06F 1/16 235/462.43 |
| 6,363,355 B1 | * | 3/2002 | Morrison | A47F 9/047 705/16 |

(Continued)

FOREIGN PATENT DOCUMENTS

| | | |
|---|---|---|
| EP | 1986168 A2 | 10/2008 |
| GB | 2505867 | 3/2014 |
| WO | 2009126538 A2 | 10/2009 |

OTHER PUBLICATIONS

EP Search Report—Aug. 11, 2023.

*Primary Examiner* — Suezu Ellis
(74) *Attorney, Agent, or Firm* — Schwegman Lundberg & Woessner, P.A.

(57) ABSTRACT

A base self-service terminal (SST) system comprises a host device and a first set of peripherals. The base SST system can operate in standalone mode to process self-service transactions when the base SST system is placed on a horizontal surface or mounted to a pedestal. The base SST system processes the self-service transactions utilizing the first set of peripherals and a second set of peripherals when the base SST system is docked within an integrated peripheral device or a peripheral bridge appliance. The integrated peripheral device comprises the second set of peripherals or the second set of peripherals are made available through the peripheral bridge appliance. One or more additional peripherals are attachable and removable from the base SST system and one or more accessory modules are attachable and removable from the base SST system, the integrated peripheral device, and/or the peripheral bridge appliance.

11 Claims, 16 Drawing Sheets

(56) References Cited

U.S. PATENT DOCUMENTS

| | | | |
|---|---|---|---|
| 2004/0041021 A1* | 3/2004 | Nugent, Jr. | A47F 9/047 |
| | | | 235/383 |
| 2006/0131409 A1* | 6/2006 | Haller | G06F 1/1607 |
| | | | 235/449 |
| 2009/0198582 A1* | 8/2009 | Tokorotani | G06Q 20/208 |
| | | | 705/17 |
| 2012/0074218 A1* | 3/2012 | Walsh | G07G 1/12 |
| | | | 235/375 |
| 2015/0193754 A1* | 7/2015 | Lam | G06F 11/30 |
| | | | 705/16 |
| 2016/0224065 A1* | 8/2016 | Weldon | G06F 1/1632 |
| 2017/0076269 A1* | 3/2017 | Saeed | G07G 1/0018 |
| 2018/0341940 A1* | 11/2018 | Suzuki | G06Q 20/206 |
| 2020/0058008 A1 | 2/2020 | Hicks et al. | |
| 2021/0011517 A1 | 1/2021 | Murdock et al. | |
| 2021/0375104 A1* | 12/2021 | Handshaw | G06Q 20/204 |
| 2023/0032651 A1* | 2/2023 | Kawaguchi | G07G 1/0045 |
| 2024/0211912 A1* | 6/2024 | Johnson | G06Q 20/204 |

\* cited by examiner

MODULAR SELF-SERVICE CHECKOUT SYSTEM

RELATED APPLICATIONS

This application is a non-provisional application that claims the benefit of Provisional Application No. 63/240,599 entitled "Modular, Portable, and Reconfigurable Interactive Displays, Terminals, and Peripherals with Interface and Store-Wide and Customer-Specific Automated Assistance, Managing, and Monitoring," filed on Sep. 3, 2021, the disclosure of which is incorporated in its entirety herein.

BACKGROUND

Typically, self-checkout machines (SCOs) are all-in-one appliances with a significant physical footprint. Furthermore, a substantial amount of commerce is now conducted online, such that a fully loaded SCO is often not required by many retailers. In fact, a growing number of retailers would like to have a custom-selection of features available with their SCOs for purposes of reducing cost and reducing the physical footprint in their stores that typical SCOs require.

Conventional SCOs also do not permit the integrated peripherals (e.g., printers, scanners, scales, card readers, keypads, display, etc.) to be rearranged and assembled in custom configurations. Retailers are frequently desiring to rearrange their checkout areas in manners that their research has indicated would be more functional and drive more revenue.

Traditional SCO devices are designed to be shipped as a large complete unit; making logistics and shipping costly. Further, retailers can change their requirements after ordering SCO devices, which necessitates disassembling and reassembling the units before shipping. For example, a retailer may desire to have an additional peripheral unit or may desire that a certain peripheral unit be removed. Such a change may be cumbersome as the units are often bulky, heavy, and integrated within a single overall housing of the SCO. Moreover, making the change at the site of the retailer is unrealistic since the necessary personnel and equipment to make the change will not be available at the site. As a result, SCO modifications requested after an initial order can result in delays and substantial expense.

SUMMARY

In various embodiments, a modular self-service terminal (SST) system and a method of configuring a modular SST system are presented. The modular SST system includes a base SST system. The base SST system includes a host device and a first set of peripherals. The base SST system can be operated in standalone mode for processing self-service transactions utilizing the first set of peripherals when the base SST system is resting on a horizontal surface or is mounted to a pedestal. In other aspects, the base SST system processes the self-service transactions utilizing the first set of peripherals and a second set of peripherals when the base SST system is docked within an integrated peripheral device or a peripheral bridge appliance. The second set of peripherals may be provided by the integrated peripheral device or are made available through the peripheral bridge appliance. Additional peripherals can be interfaced and attached to the base SST system. Furthermore, accessory modules can be attached and removed from surfaces associated with the base SST system, the integrated peripheral device, and the peripheral bridge appliance. Any desired configuration of the base SST system, the integrated peripheral device, the peripheral bridge appliance, the additional peripherals, and the accessory modules can be made to form a desired modular SST system.

DETAILED DESCRIPTION

As discussed above, retailer needs have changed with the explosion of online commerce such that the needs of the retailer with respect to self-service terminal (SST) or SCO systems have changed. No longer are retailers willing to accept that an SST system has to be a monolithic unit with integrated peripherals that provide no ability to reconfigure and rearrange to fit the needs and physical space requirements of the retailer's business.

As will be demonstrated herein and below, modular SST devices are provided that can be custom configured, arranged, and interfaced to form a plethora of configurations for an operational SST system. A host device that controls processing and interacts with peripherals. The host device can include at least one integrated peripheral. For example, a host device's motherboard can be within a touch display with an internal motherboard connection to the touch display's circuit or printed circuit board (PCB). As another example, a bioptic scanner includes the host device and a PCB for the bioptic scanner. Still further, an integrated payment device that includes a card reader, keypad, and optional small display includes the host device. Alternatively, a single motherboard of a host device includes a separate processor and circuitry for a peripheral device. Any number of the peripheral devices discussed herein and below can include the host device for the SST system. The additional peripherals that combine to form the SST system are connected to the host device via peripheral ports and/or peripheral hubs. The location of the peripheral ports for the peripherals and the host device are configured to match the arrangements/configurations of various SST systems discussed herein and below. The host device includes a processor and executable instructions for a transaction manager that manages and processes transactions for the corresponding SST system.

Figure 1A:
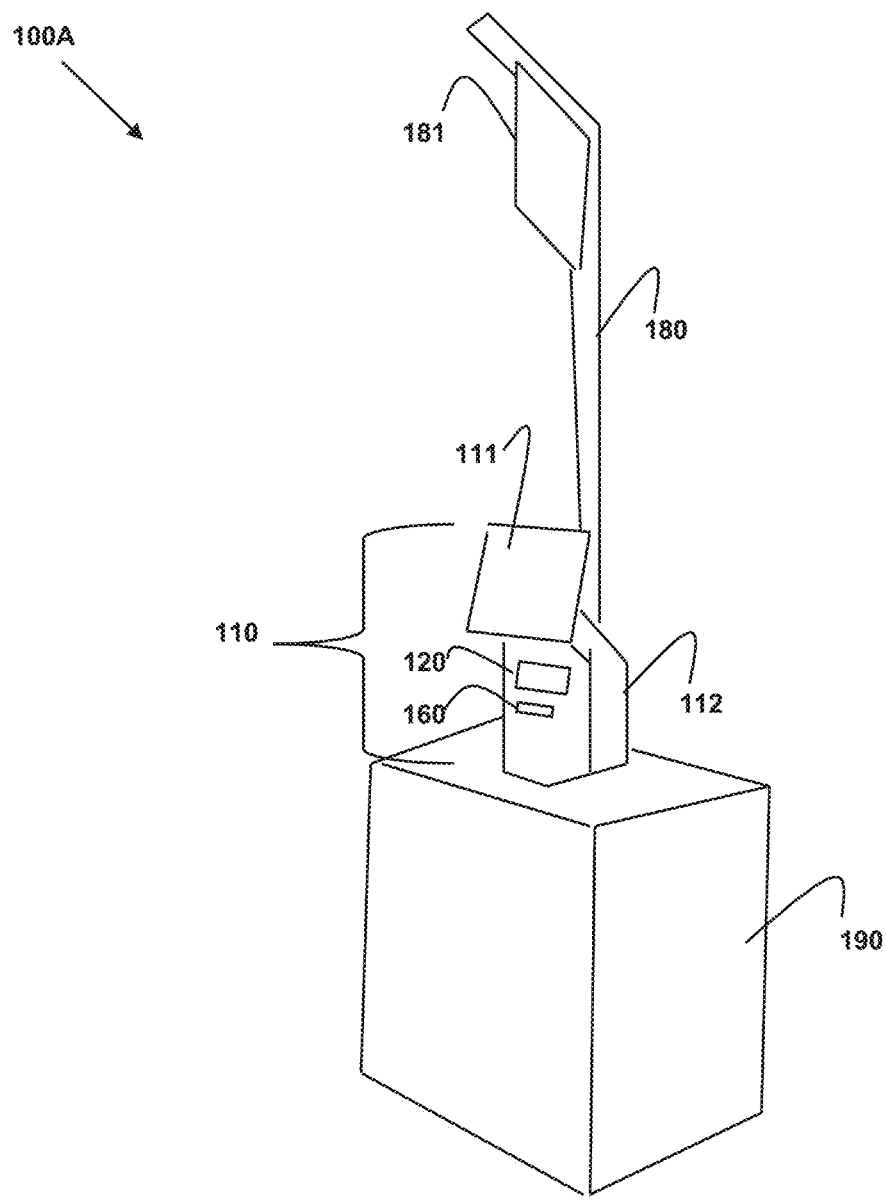
FIG. 1A is a diagram of a configuration of modular SST devices that combine to operate as an SST system, according to an example embodiment.

FIG. 1A is a diagram 100A of a configuration of modular SST devices that combine to operate as an SST system 110, according to an example embodiment. The SST system 110 includes a touch display 111, and integrated peripheral pedestal 112, and optionally a status display 181. The SST system 110 is configured on a base countertop 190 and the status display 181 is situated at a top of a status pole 180. The integrated peripheral pedestal 112 includes a vertical scanner 120 and a receipt printer 160. The host device that manages and performs the transaction of SST system 110 can be integrated within touch display 111 or integrated peripheral pedestal 112.

Figure 1B:
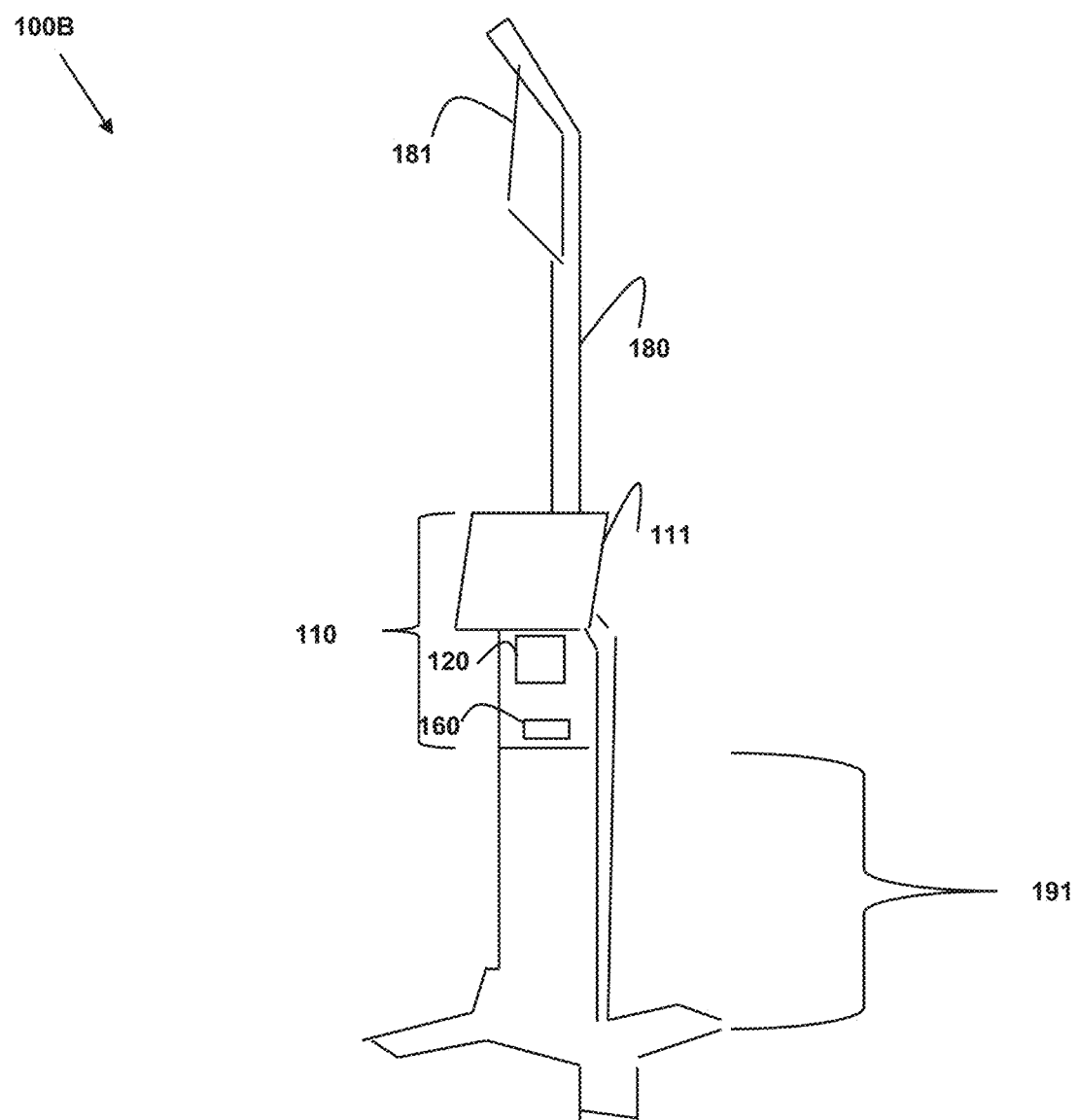
FIG. 1B is a diagram of a different configuration of modular SST devices that combine to operate as an SST system, according to an example embodiment.

FIG. 1B is a diagram 100B of a different configuration of modular SST devices that combine to operate as an SST system 110, according to an example embodiment. The SST system 110 includes a touch display 111, a vertical scanner 120, a receipt printer 160, and optionally a status display 181. The SST system 110 is attachable and detachable from a base pedestal 191. The status display 181 is situated at a top portion of a status pole 180. The host device is integrated within SST system 110 for managing and performing transactions.

Figure 1C:
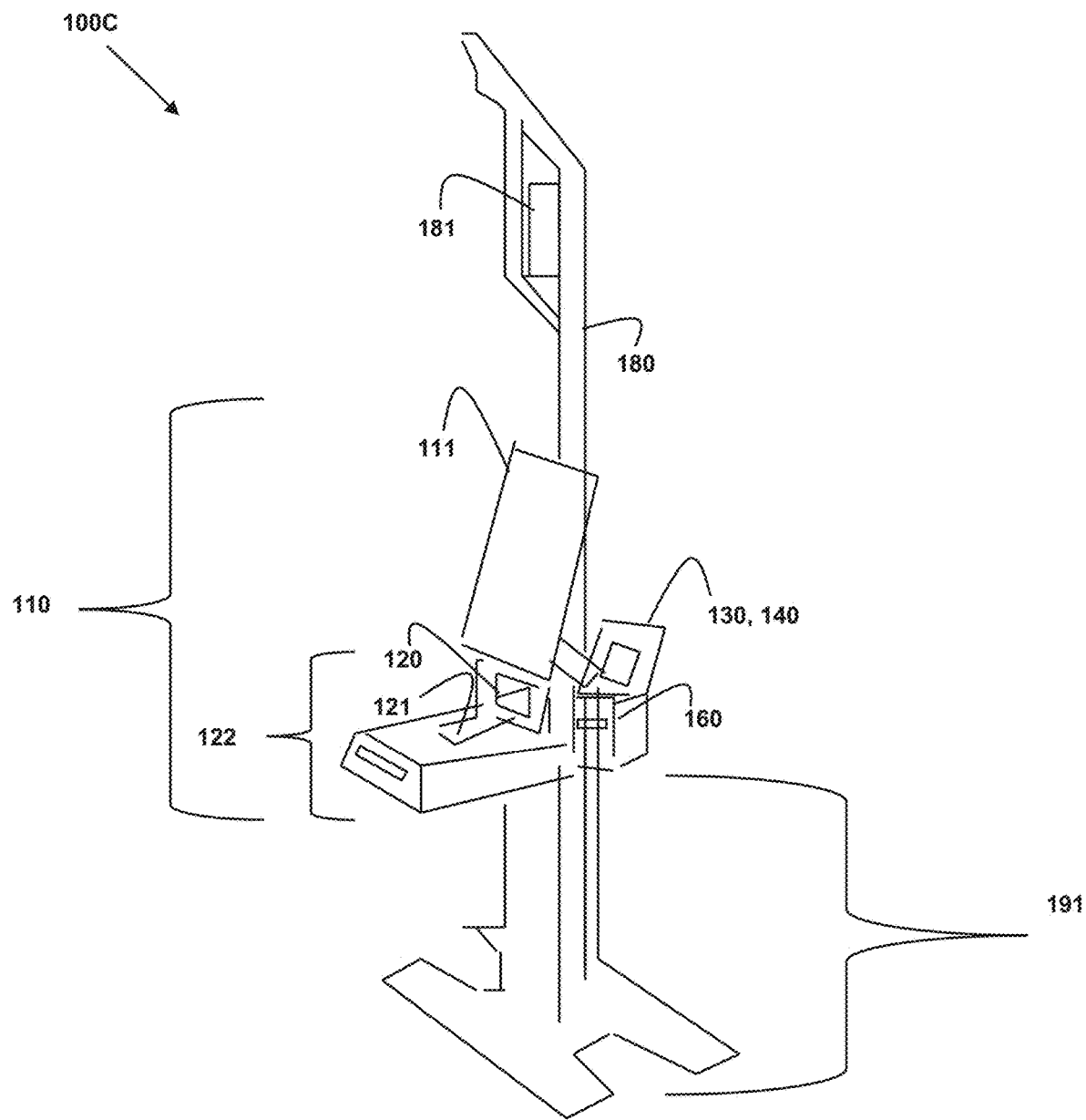
FIG. 1C is a diagram of still a different configuration of modular SST devices that combine to operate as an SST system, according to an example embodiment.

FIG. 1C is a diagram 100C of still a different configuration of modular SST devices that combine to operate as an SST system 110, according to an example embodiment. The SST system 110 includes a touch display 111, a bioptic scanner 122, and optionally a status display 181. The touch display 111 can include an integrated card reader 130 (not shown in FIG. 1C). The bioptic scanner 122 includes a vertical scanner 120 and a horizontal scanner 121. The status display 181 is situated at a top portion of status pole 180. The SST system 110 is attachable and detachable from base pedestal 191. Additional peripherals may be attached to the base SST system 110, such as a combined card reader 130 and key/PIN pad 140 and a receipt printer 160. The host device is integrated within SST system 110 for managing and performing transactions.

It is noted that any card reader 130 discussed in the example SST system configurations can be a chip card reader, a magnetic strip card reader, and/or a Near Field Communications (NFC) tab-based or wireless contact card reader. So, in FIG. 1C, combined reader 130 and keypad 140 can be replaced by an integrated card reader 130 in a bottom portion of touch display 111.

Figure 1D:
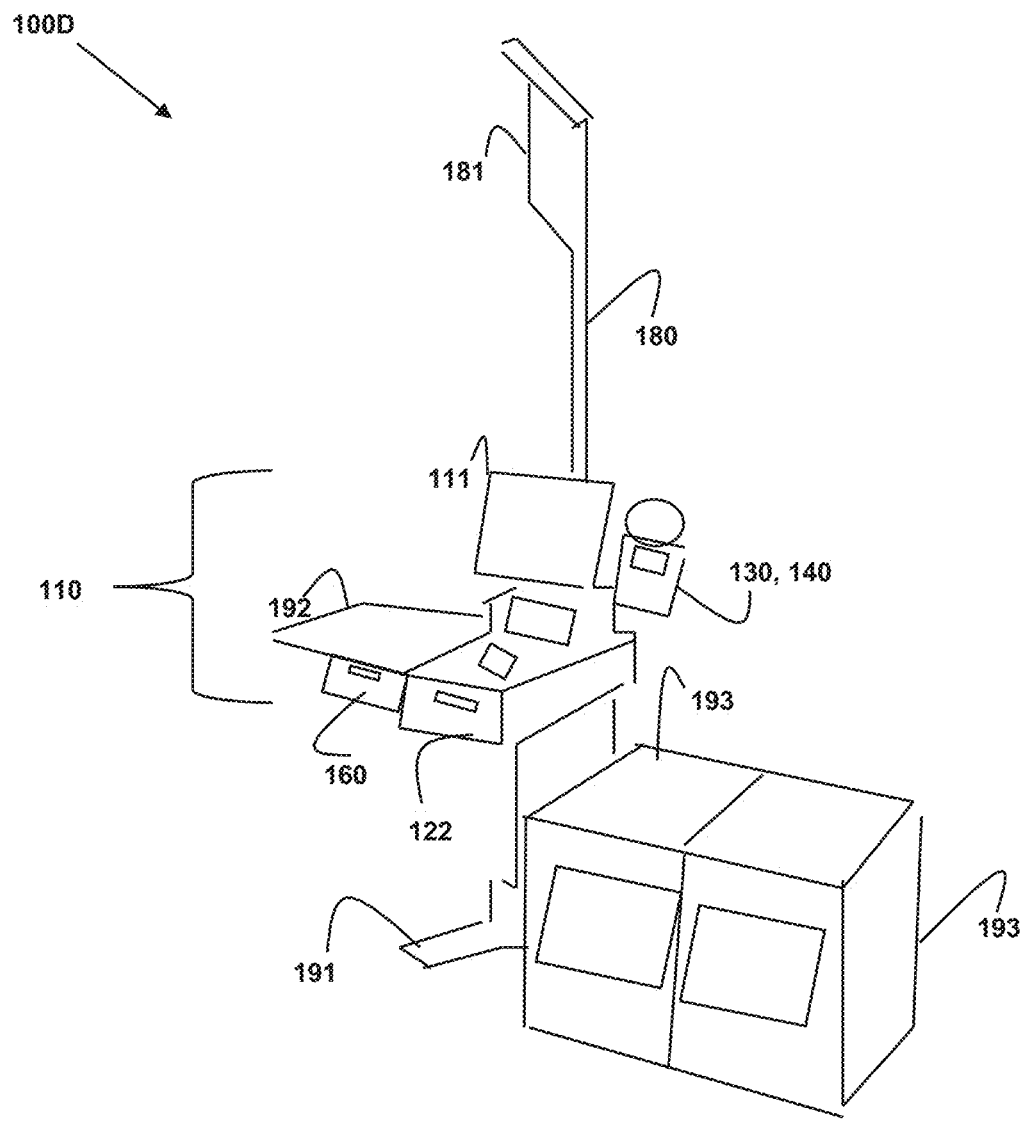
FIG. 1D is diagram of another configuration of modular SST devices that combine to operate as an SST system, according to an example embodiment.

FIG. 1D is diagram 100D of another configuration of modular SST devices that combine to operate as an SST system 110, according to an example embodiment. The SST system 110 includes a touch display 111, a bioptic scanner 122, a combined card reader 130 and keypad/personal identification number (PIN) pad 140, receipt printer 160, and optionally a status display 181. The SST system 110 is configured with two bag wells 193 and a side shelf 192. Again, SST system 110 is attachable and detachable from a base pedestal 191.

Figure 1E:
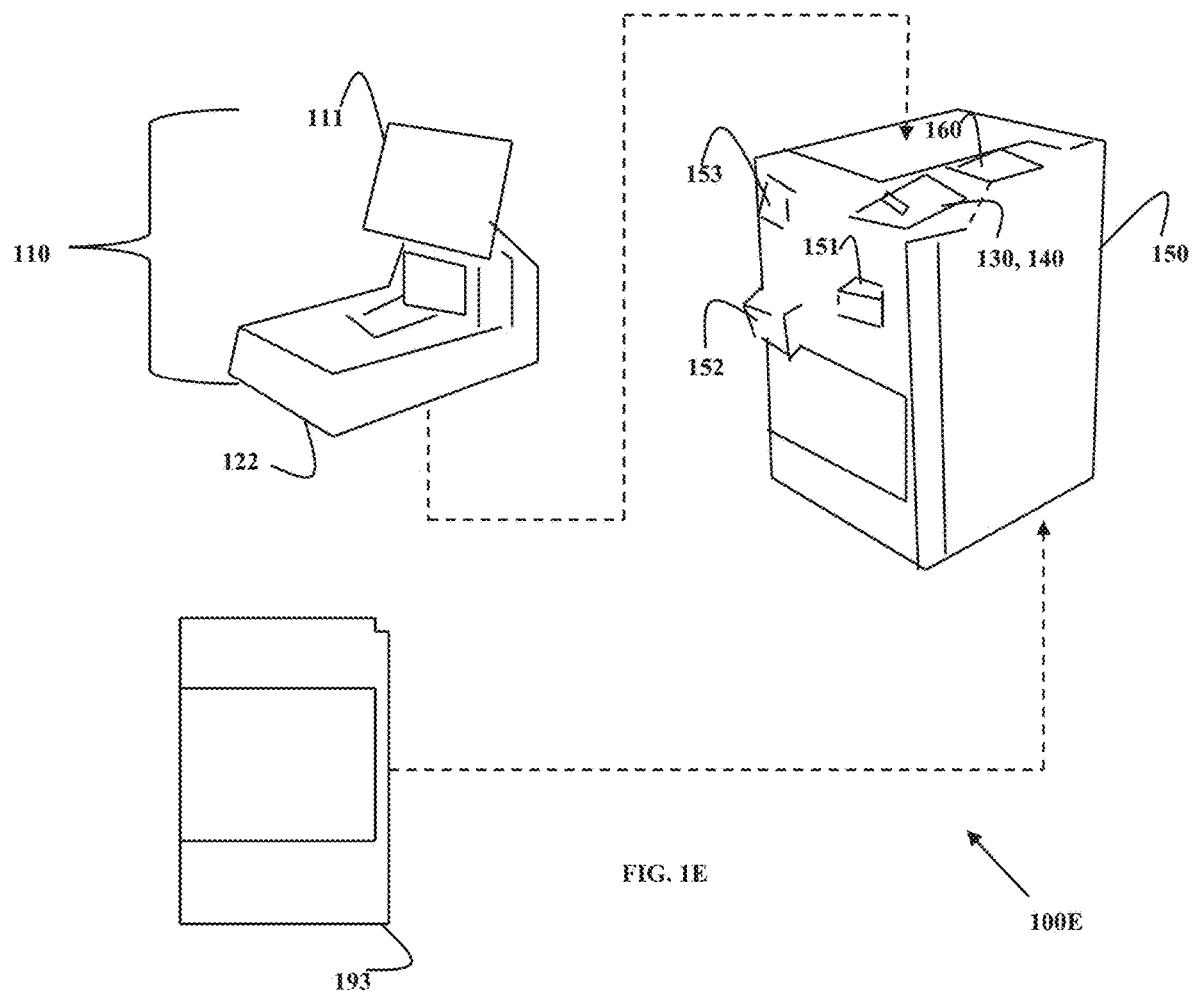
FIG. 1E is a diagram that illustrates three modular SST devices and the manner in which the three devices can be configured to form an SST system, according to an example embodiment.

FIG. 1E is a diagram 100E that illustrates three modular SST devices and the manner in which the three devices can be configured to form an SST system 110 with 150, according to an example embodiment. A base SST system 110 includes a touch display 111 and a bioptic scanner 122. The base SST system 110 is attachable and detachable to a media dispenser/acceptor 150 to form a single SST system represented by 110 and 150 in diagram 100E. An additional bag well 193 can be attached and detached from a side of media dispenser/acceptor 150. Media dispenser/acceptor 150 includes a variety of peripherals such a receipt printer 160, a combined card reader 130 and key/PIN pad 140, and a near field communication (NFC) transceiver 153. The media dispenser/acceptor 150 also includes a media acceptor and dispenser chute 151 and coin acceptor and dispenser chute 152. The host device can reside within the base SST system 110 for managing and processing transaction on a single SST system represented by 110 and 150 where 110 is attached to one or more port interfaces situated on a top and optionally recessed surface of media dispenser/acceptor 150. The corresponding port interfaces for base system 110 are located on a bottom and/or bottom back portion of base system 110.

Although not pictured in FIG. 1E, media dispenser/acceptor 150 can also include an alternative input device referred to as a universal navigator (uNav). The uNav include 4 tactile buttons for up, down, left, right arranged in a diamond shape, with a central button for activating the currently selected option of the customer. Additionally, media dispenser/acceptor 150 can include an audio jack for private audio, a volume button for controlling the audio, and tactile markings to aid the user in locating each element during a self-service transaction.

Figure 1F:
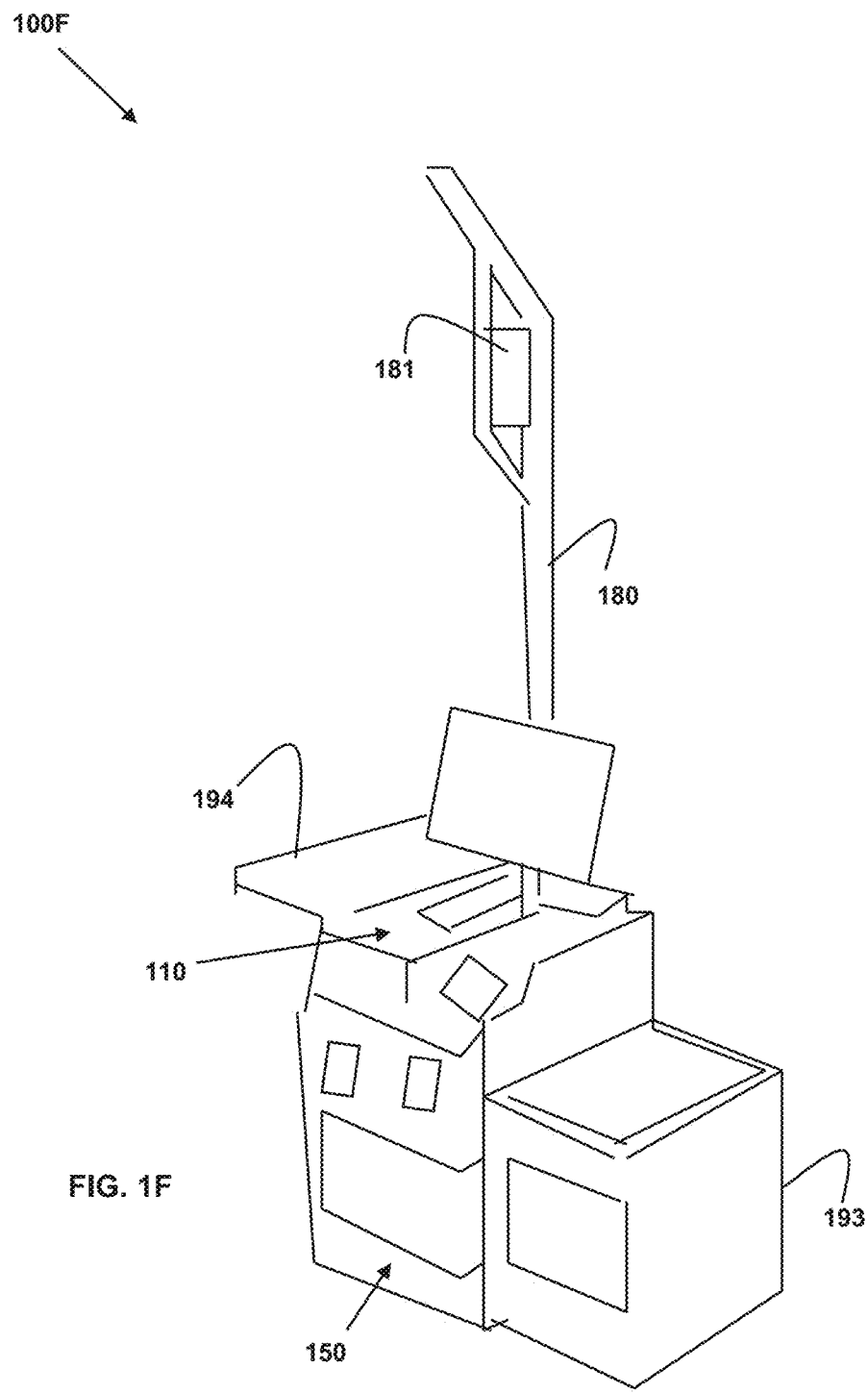
FIG. 1F is a diagram of the three devices of FIG. 1E assembled and combined with two additional modules to form an SST system, according to an example embodiment.

FIG. 1F is a diagram 100F of the three devices of FIG. 1E assembled and combined with two additional modules to form an SST system represented by 110 and 150, according to an example embodiment. Base SST system 110 is attached and interfaced via the corresponding port interfaces to a top of media dispenser/acceptor 150 to form SST system 110 and 150. SST system 110 and 150 optionally includes a status display 181. SST system 110 and 150 is illustrated with on optional side shelf 194 and an optional bag well 193.

As discussed herein above and below any discussed bioptic scanner 122 may include an integrated weigh scale. Additionally, as discussed herein above and below any discussed bag well 193 may include an integrated bag scale. The weigh scale can be used to report weights of produce items during a transaction or scanned items for security purposes to the host device while the bag scale can be used to report weights of items placed in bags on the bag well 193 for security purposes to the host device.

Figure 1G:
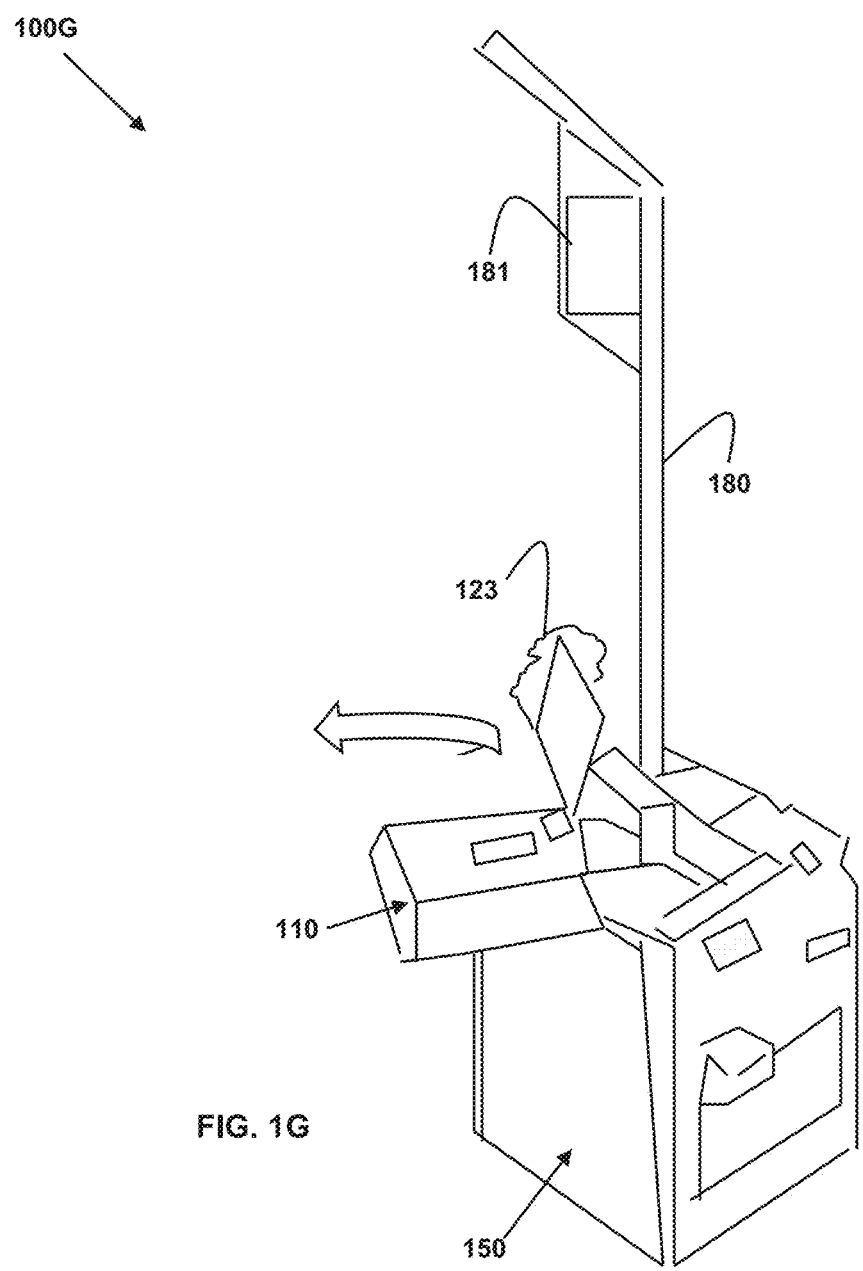
FIG. 1G is a diagram that illustrates the adjustability of a modular SST device to be custom oriented within an SST system, according to an example embodiment.

FIG. 1G is a diagram 100G that illustrates the adjustability of a modular SST device to be custom oriented within an SST system 110 and 150, according to an example embodiment. Base SST system 110 is pivotably attached to media dispenser/acceptor 150 such that base system 110 can be oriented towards a cashier to operate SST system 110 and 150 as a point-of-sale (POS) terminal for cashier-assisted transactions. Although not illustrated in FIG. 1G, a second customer display can be added and oriented towards the customer for the cashier-assisted transactions. Thus, SST system 110 and 150 can be operated as a POS terminal for cashier-assisted transactions when base SST system 110 is pivoted towards a rear of media dispenser/acceptor 150 with the customer situated in front of media dispenser/accepter 150. SST system 110 and 150 also includes a handheld scanner 123 attached to a side of the touch display 111.

Figure 1H:
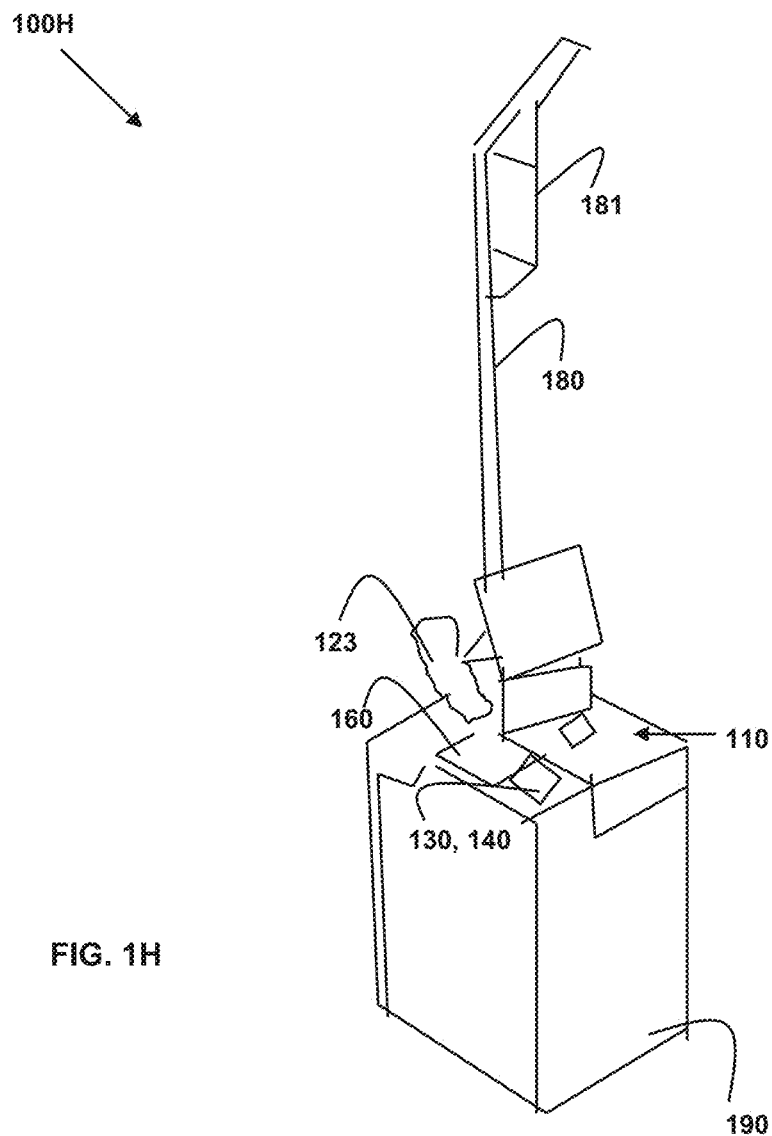
FIG. 1H is a diagram of yet another configuration of modular SST devices that combine to operate as an SST system, according to an example embodiment.

FIG. 1H is a diagram 100H of yet another configuration of modular SST devices that combine to operate as an SST system 110, according to an example embodiment. Base SST system 110 is illustrated in diagram 100H and includes touch display 111 and bioptic scanner 122. The base SST system 110 is attachable and detachable from a base countertop 190. Base countertop 190 can optionally include peripheral port connections for a combined card reader 130 and key/PIN pad 130 and a receipt printer 160. Alternatively, peripheral ports on base SST system 110 allow for connection to receipt printer 160, combined card reader 130 and key/PIN pad 140. SST system 110 can optionally include a handheld scanner 123 and a status display 181 situated at a top portion of status pole 180. Alternative what is presented and descripted as base countertop 190 can be replaced with media dispenser/acceptor 150 in diagram 100H.

Figure 1I:
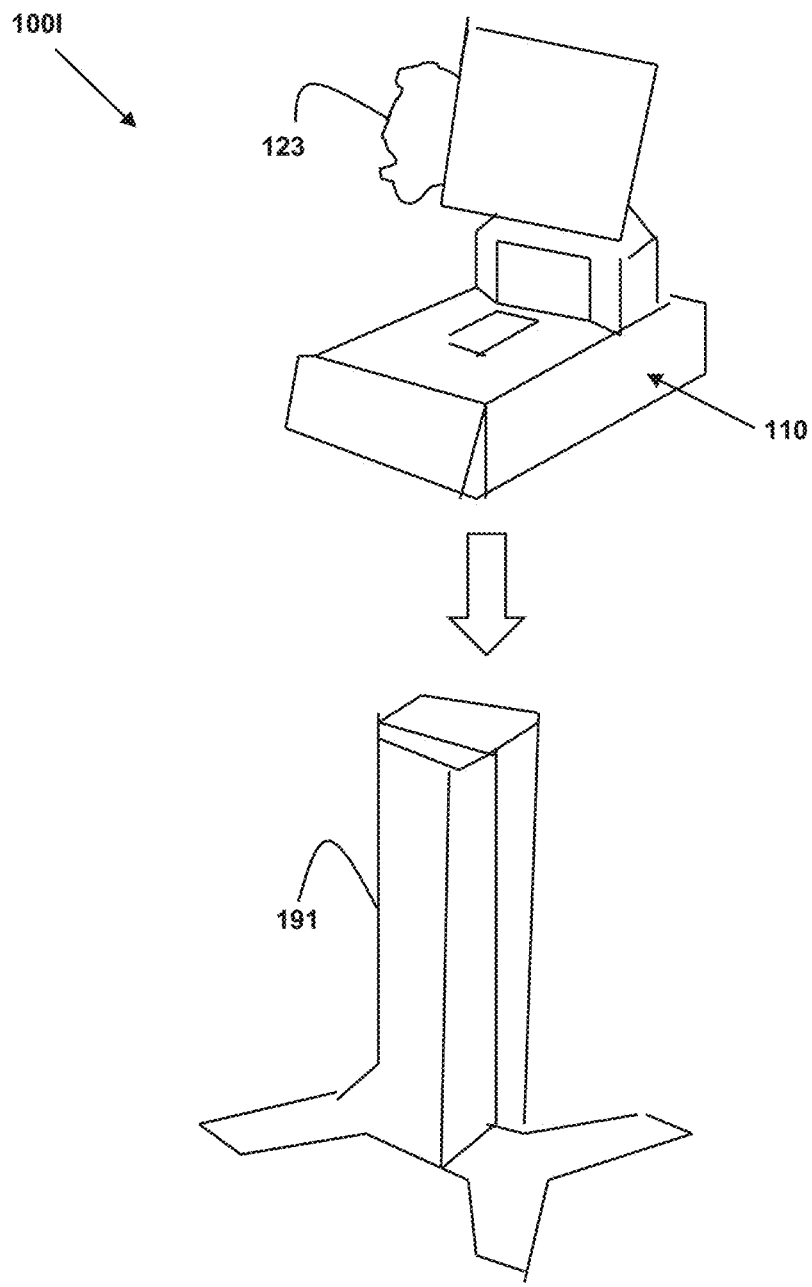
FIG. 1I is a diagram that illustrates attaching an SST system to a pedestal, according to an example embodiment.

FIG. 1I is a diagram 100I that illustrates attaching an SST system 110 to a base pedestal 191, according to an example embodiment. Base SST system 110 is attachable and detachable from base pedestal 191. Thus, base system 110 can be attached and detached from media dispenser/acceptor 150, base countertop 190, and/or base pedestal 191.

Furthermore the base SST system 110 can be assembled from touch display 111 and integrated peripheral base 112 as shown in FIGS. 1A and 1B. Alternatively, base SST system 110 can be assembled from touch display 111 and bioptic scanner 122 as shown in FIGS. 1C-1I. Still further the base SST system 110 can be manufactured as a single device to include touch display 111 and integrated peripheral base 112 or to include touch display 111 and bioptic scanner 122. Additionally, card reader 130 can be integrated at a bottom of touch display 111 as shown in FIG. 1C.

Figure 1J:
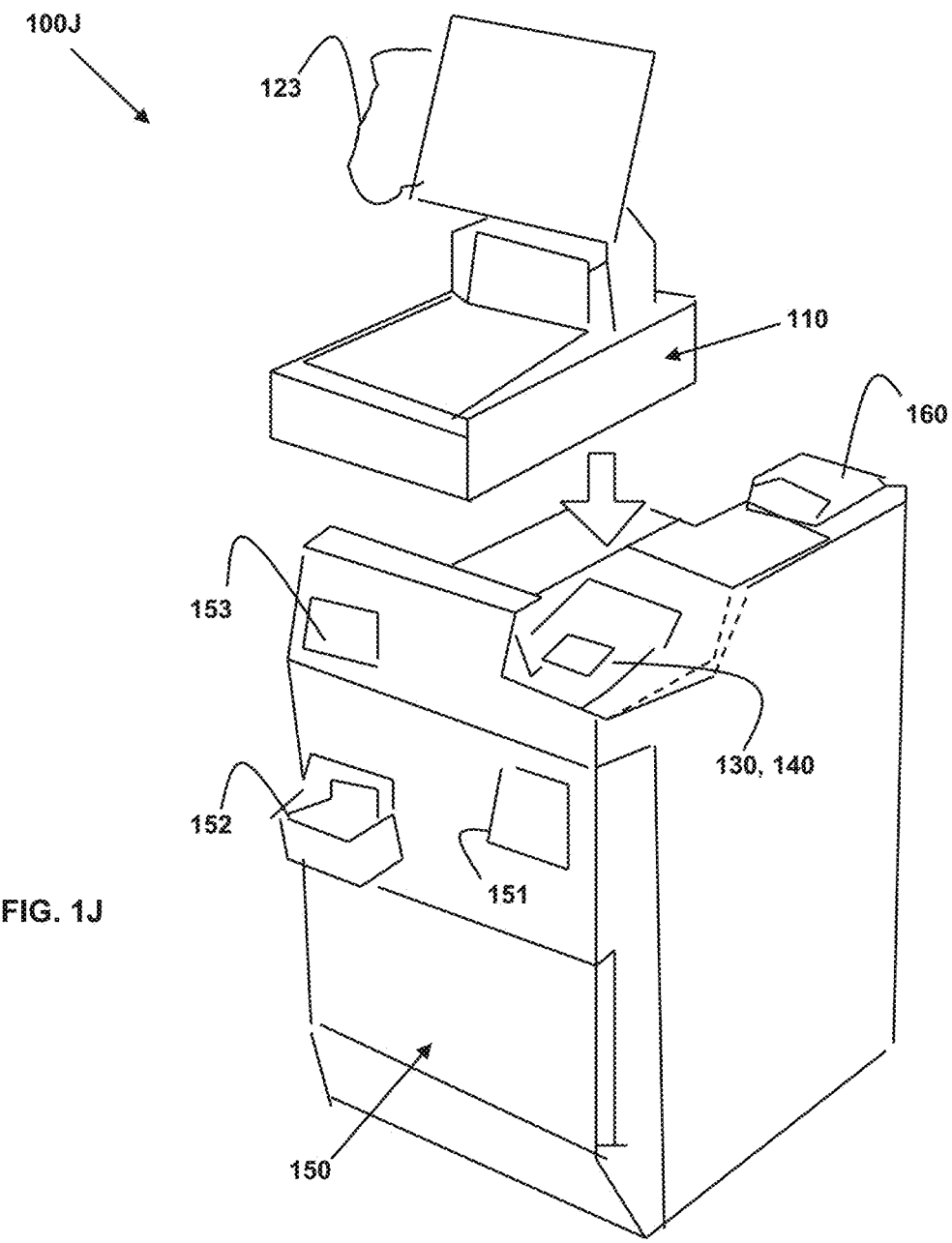
FIG. 1J is a diagram that illustrates attaching two modular SST devices to form an SST system, according to an example embodiment.

FIG. 1J is a diagram 100J that illustrates attaching two modular SST devices to form an SST system 110 and 150, according to an example embodiment. Base SST system 110 is attachable and detachable from a top recessed portion of media dispenser/acceptor 150. Media dispenser/acceptor 150 includes a media acceptor/dispenser chute 151, a coin acceptor/dispenser chute 152, an NFC transceiver 153, a combined card reader 130 and key/PIN pad 140, and a receipt printer 160. Base SST system 110 includes a touch display 111 and a bioptic scanner 122. Optionally, a horizontal scan window of bioptic scanner 122 includes an integrated weigh scale.

Figure 1K:
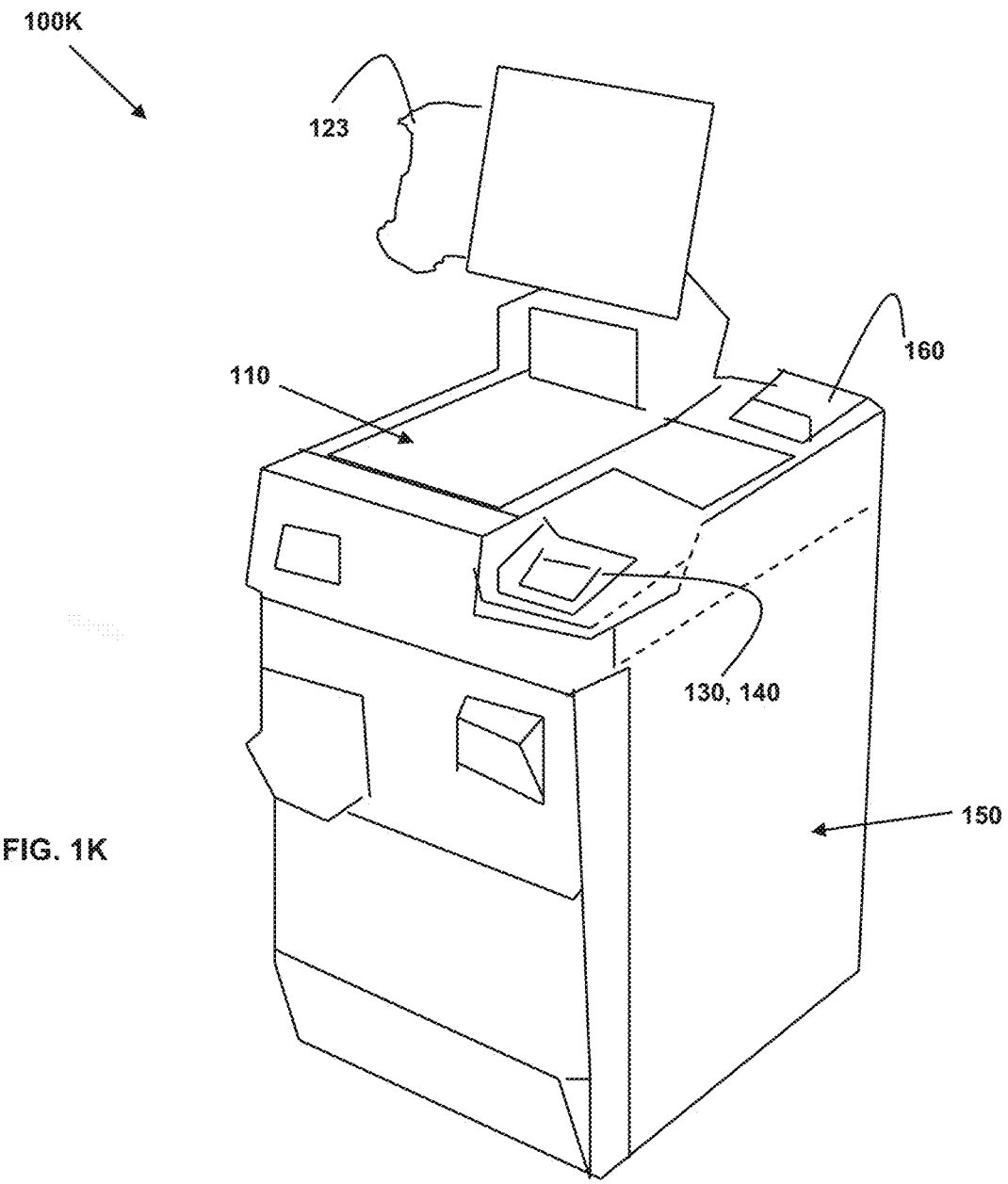
FIG. 1K is a diagram of the two module SST devices of FIG. 1J attached together to form an SST system, according to an example embodiment.

FIG. 1K is a diagram 100K of the two module SST devices of FIG. 1J attached together to form an SST system 110 and 150, according to an example embodiment. SST system 110 and 150 also includes an optional handheld scanner 123 added to a side of touch display 111 via holster.

Figure 1L:
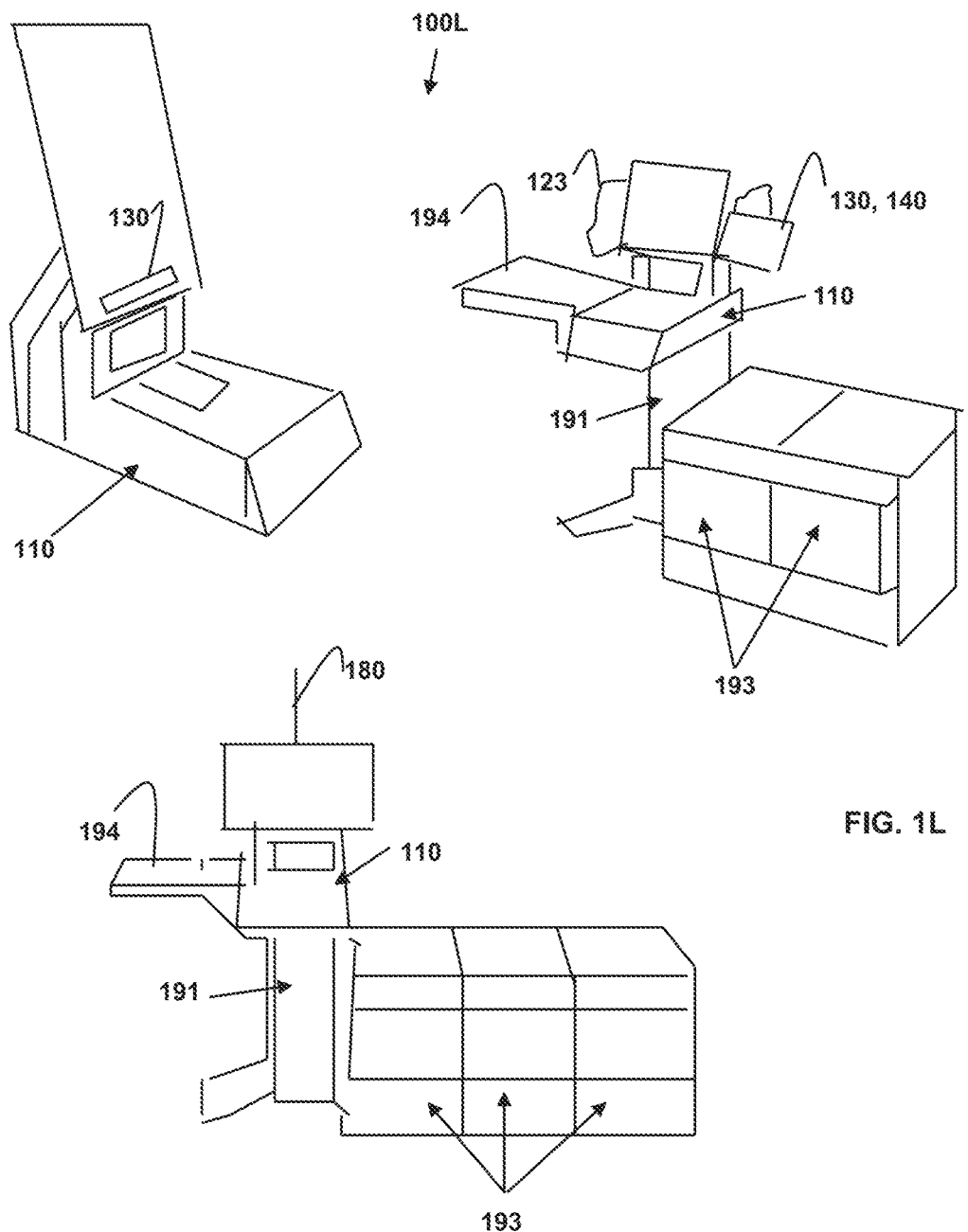
FIG. 1L is a diagram of three differently configured SST systems, according to an example embodiment.

FIG. 1L is a diagram 100L of three differently configured SST systems 110, according to an example embodiment. Each of the three diagrams illustrate a base SST system 110 arranged with different modular peripheral devices and different modules. The top leftmost SST system 110 is the base SST system 110 as a standalone unit that can be sat or placed on any horizontal surface or countertop for operation. The touch display 111 of the leftmost SST system 110 includes an integrated card reader 130 at a bottom of touch display 111. The top rightmost SST system 110 includes base SST system 110 with a handled scanner 123, a combined card reader 130 and key/PIN pad 140, and bag wells 193. Bag wells 193 include an integrated bag scale for weighing items during a transaction. Top rightmost SST system 110 also includes a side shelf module 194 and a base pedestal 191 upon which base SST system 110 is attached. Bottommost SST system 110 optionally includes a status display 181 (not illustrated in FIG. 1L attached to a status pole 180 (illustrated in FIG. 1L). The bottommost SST system 110 includes base SST system 110 with three bag wells 193. As is apparent, 0 to N bag wells may be added to any SST system 110 or 110 and 150 discussed herein. Although not illustrated in bottommost SST system 110, touch display 111 can include integrated card reader 130.

Figure 1M:
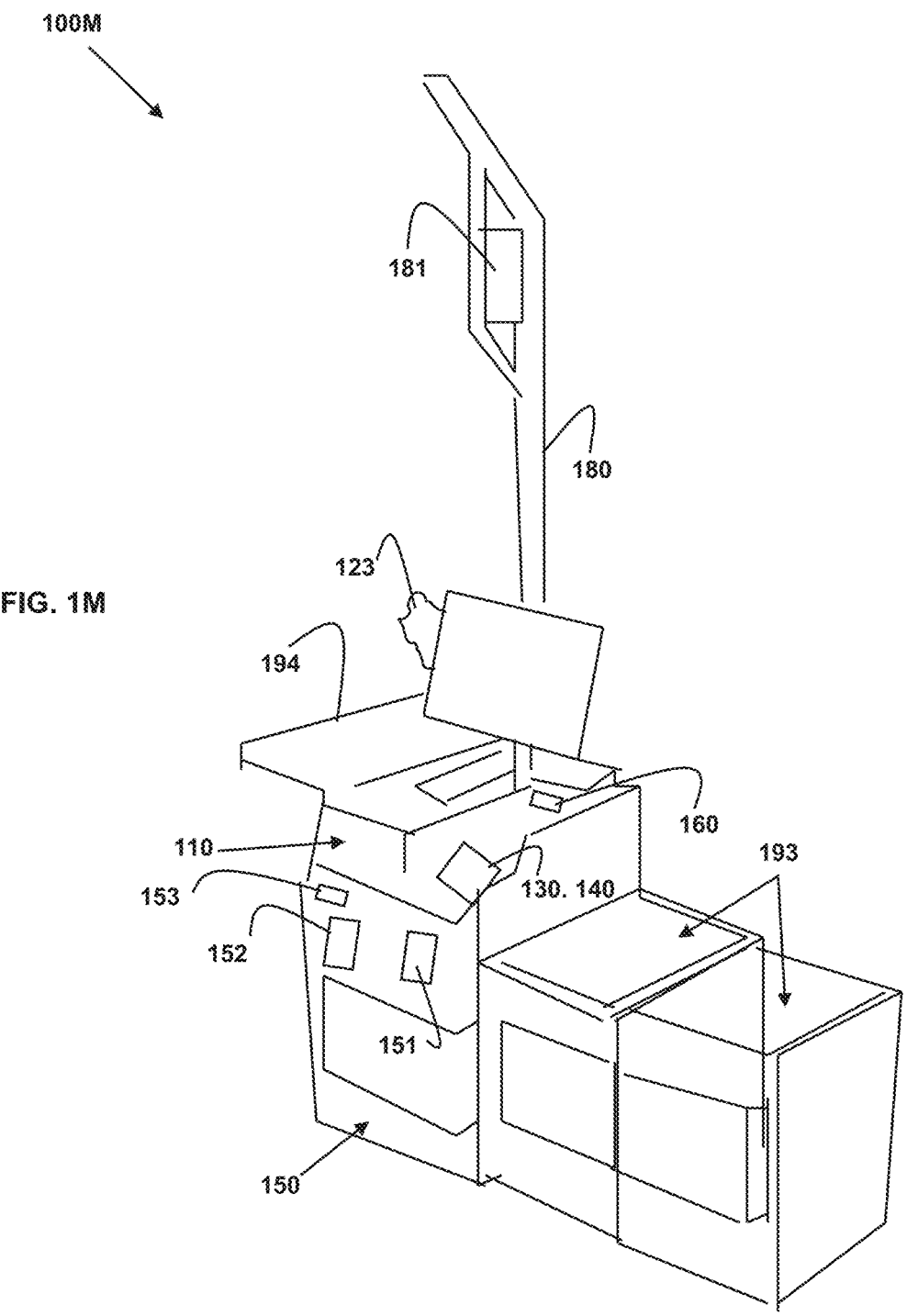
FIG. 1M is a diagram of a fully loaded SST system, according to an example embodiment.

FIG. 1M is a diagram 100M of a fully loaded SST system 110 and 150, according to an example embodiment. SST system 110 and 150 includes modules and peripherals for a side shelf 194, two bag wells 193, a handheld scanner 123, a status light 181 affixed to a status pole 180. Media dispenser/acceptor 150 includes a media acceptor/dispenser chute 151, a coin acceptor/dispenser chute 152, an NFC transceiver 153, a combined card reader 130 and key/PIN pad 140, and receipt printer 160.

Figure 1N:
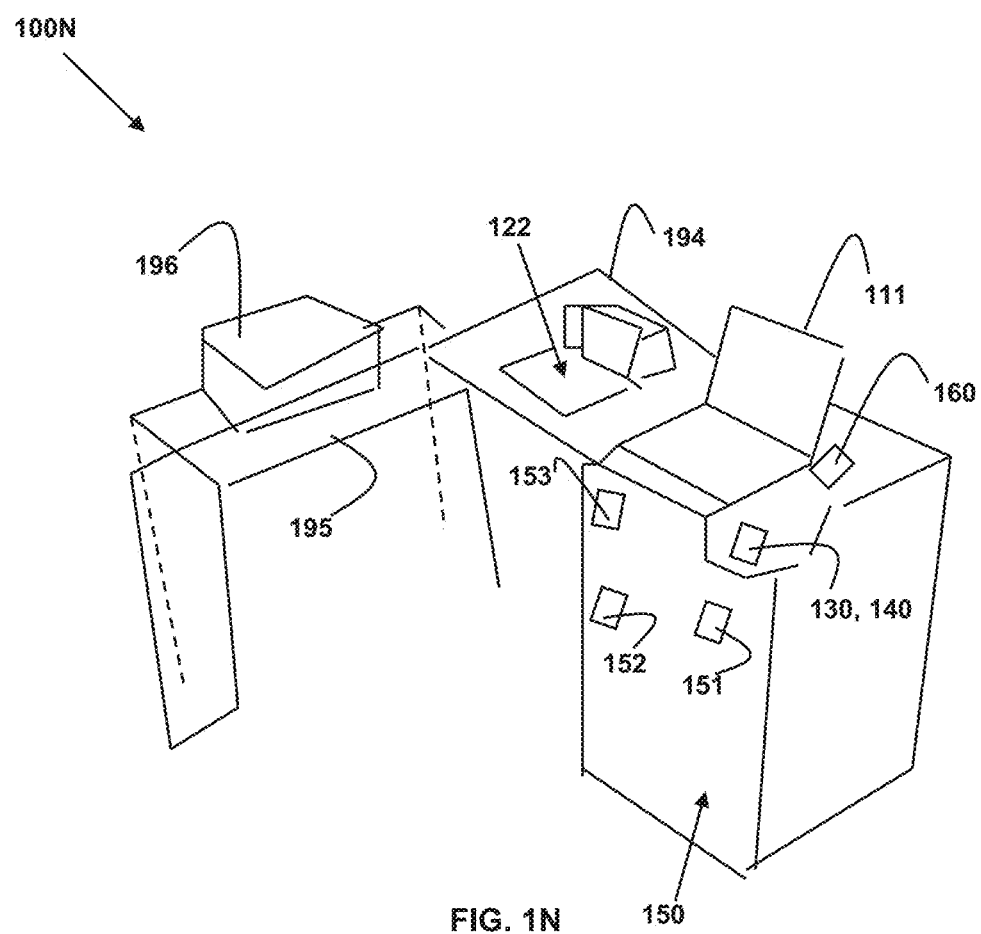
FIG. 1N is a diagram of a workstation or desktop configuration of modular SST devices that combine to operate as an SST system, according to an example embodiment.

FIG. 1N is a diagram 100N of a workstation or desktop configuration of modular SST devices that combine to operate as an SST system 111, 122, and 150, according to an example embodiment. Touch display 111 is attachable to media dispenser/acceptor 150 on a top surface as illustrated in FIG. 1N. Bioptic scanner 122 is integrated into a separate countertop 194. Touch display 111, bioptic scanner 122, and media dispenser/acceptor 150 combine to form a single SST system 111, 122, and 150. Media dispenser/acceptor 150 includes a receipt printer 160, a combined card reader 130 and key/PIN pad 140, a media acceptor/dispenser chute 151, a coin acceptor/dispenser chute 152, and NFC transceiver 153. A side table 195 is situated perpendicular and adjacent to countertop 194 for purposes of holding a customer's basket or bag 196. An underside of countertop 194 includes recessed clearance for a customer's wheelchair to fit such that the customer is directly facing the bioptic scanner, with touch display 111 and media dispenser/acceptor 150 to the right of the customer, and side table 195 to the left of the customer. It is noted that touch display 111 can be moved onto countertop 194 adjacent to bioptic scanner 194. The arrangement of the table 195, countertop 194, and media dispenser/acceptor 150 relative to one another can also be changed to provide optimal accessibility to disabled customers during self-checkouts. The host device can be integrated into touch display 111, bioptic scanner 122, or media dispenser/acceptor 150.

Figure 2:
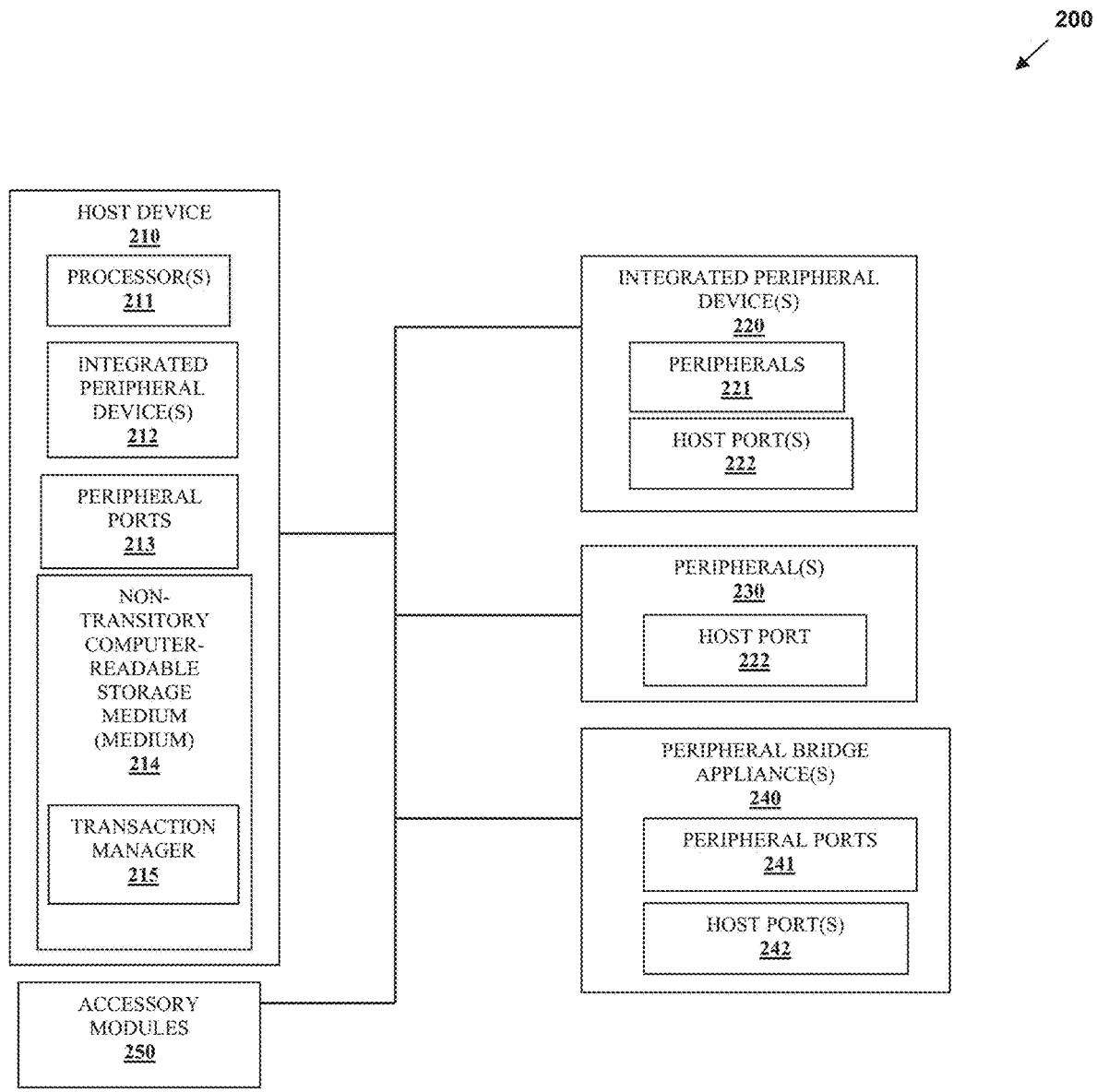
FIG. 2 is a diagram of an SST system, according to an example embodiment.

FIG. 2 is a diagram of an SST system 200, according to an example embodiment. It is to be noted that the components are shown schematically in greatly simplified form, with only those components relevant to understanding of the embodiments being illustrated.

Furthermore, the various components (that are identified in FIG. 2) are illustrated and the arrangement of the components is presented for purposes of illustration only. It is to be noted that other arrangements with more or fewer components are possible without departing from the teachings of modular SST systems, presented herein and below.

System 200 includes a host device, an integrated peripheral device 220, peripherals 230, optional peripheral bridge appliances 240, and accessory modules 217. Host device 210 includes one or more processors 211, at least one integrated peripheral device 212, peripheral ports 213, and a non-transitory computer-readable storage medium (herein-after just "medium") 214, which includes executable instructions for a transaction manager 215. The instructions when provided to processor 211 cause processor 211 to perform the operations discussed herein for transaction manager 215. In an embodiment, host device 210 includes an integrated peripheral 212 that is touch display 111, bioptic scanner 122, or media dispenser/acceptor 150.

Each integrated peripheral device 220 includes a plurality of peripherals 221 and one or more host ports 222. The peripherals 221 are enclosed within a single housing for the integrated peripheral device 220. In an embodiment, integrated peripheral devices 220 include integrated touch display 111 with integrated card reader 130; peripheral pedestal 112 with vertical scanner 120 and card reader 130; a bioptic scanner 122 with vertical scanner 120 and horizontal scanner 121; a bioptic scanner 122 with integrated weigh scale; media dispenser/acceptor 150 with media handling devices and including media acceptor/dispenser chute 151, coin acceptor/dispenser chute 152, NFC transceiver 153 (optional), combined card reader 130 and key/PIN pad 140 (optional), and receipt printer 160; and bioptic scanner 122 with touch display 111.

Each peripheral 230 includes a host port 222. In an embodiment, peripherals include a touch display 111, a vertical scanner 120, a horizontal scanner 121, a handheld scanner 123, a receipt printer 160, and a bag well 193 with integrated bag weigh scale.

Each peripheral bridge appliance 240 includes peripheral ports 241 and one or more host ports 242. In an embodiment, peripheral bridge appliances include base pedestal 191 with a weigh scale for a bag well 193 peripheral port 241 and a host port 242 for SST base system 110; a status pole 180 with a status display 181 peripheral port 241 and a host port 242 to SST base system 110; base countertop 190 with one or more host ports 242 for SST base system 110 and peripheral ports 241 for one or more of status display 181, combined card reader 130 and key/PIN pad 140, and receipt printer 160; countertop 194 with a host port 242 and a peripheral port 241 for one or more of touch display 111, bioptic scanner 122, and media dispenser/acceptor 150.

Accessory modules 250 are adapted to attach to surfaces of the host device 210, integrated peripheral devices 220, and peripheral bridge appliances 240. In an embodiment, the accessory modules 250 include status pole 180 when status pole 180 just includes a channel through which a cable is run to connect status display 181 to the host device 210, base pedestal 191, bag wells 193 without any integrated bag weigh scale, side shelf 192, countertop 194 without any peripheral or host ports, and table 195.

Host device 210 is adapted to be docked and undocked from integrated peripheral devices 220, peripheral bridge appliances 240, and/or accessory modules 250. Integrated peripheral devices 220 are adapted to be connected to the host device 210 via host port(s) 222 to peripheral ports 213. Peripherals 230 are adapted to connect to host device via host port 222 to a corresponding peripheral port 213 or via peripheral bridge appliances 240 via peripheral ports 241 of the peripheral bridge appliances 240. Peripherals 230 can also be docked and undocked from host device 210 and peripheral bridge appliances 240.

The host device 210, integrated peripheral devices 220, peripherals 230, peripheral bridge appliances 240, and accessory modules 250 are manufactured in sizes and dimensions that permit configurations of a corresponding SST system 200. The SST system configurations can include any of the SST systems illustrated above in FIGS. 1A-1N.

In an embodiment, SST system 200 is base SST system 110. In an embodiment, base SST system 110 includes a host device 210 with an integrated peripheral device 212 that is touch display 111 or bioptic scanner 122. The base system 110 is adapted to be standalone for processing transactions via transaction manager 215 or adapted to be docked/undocked into an integrated peripheral device that is media dispenser/acceptor 150; docked/undocked into a peripheral bridge appliance 240 that is base countertop 190 as shown in FIG. 1H; docked/undocked into a peripheral bridge appliance 240 that is integrated peripheral pedestal 112 as shown in FIG. 1A; and/or docked/undocked into or onto accessory module 250 that is base pedestal 191 and/or countertop 194.

Any desired number and types of peripherals 230 and accessory modules 250 can be added and/or removed a base SST system 110 to form SST system 200. The various configurations are illustrated in FIGS. 1A-1N above.

In an embodiment, a base SST system 110 can be docked into a media dispenser/acceptor 150 to form SST system 200 and while docked, the base system 110 can be rotated or reoriented as illustrated in FIG. 1G. This causes transaction manager 215 to detect the orientation change via an event and switch from a self-service transaction mode of processing cashier-assisted mode of processing, such that SST system operates as a POS terminal or system instead as an SST. In an embodiment, SST system 200 includes a second peripheral device 230 display that activates and is oriented towards the customer during the cashier-assisted model of operation by the transaction manager 215.

Figure 3:
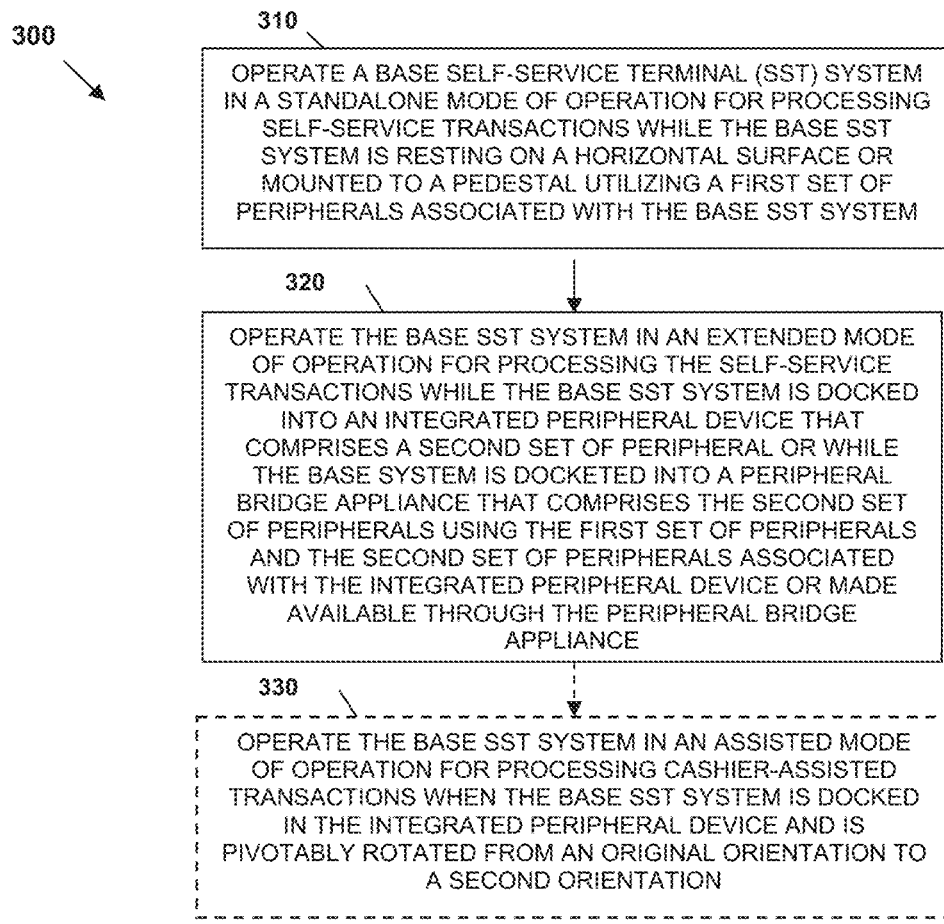
FIG. 3 is a diagram of a method for operating a modular SST system, according to an example embodiment.

FIG. 3 is a diagram of a method 300 for operating a modular SST system, according to an example embodiment. The software module(s) that implements the method 300 is referred to as a "transaction manager." The transaction manager is implemented as executable instructions programmed and residing within memory and/or a non-transitory computer-readable (processor-readable) storage medium and executed by one or more processors of a host device. The processor(s) of the device that executes the transaction manager are specifically configured and programmed to process the transaction manager. The transaction manager has access to one or more network connections during its processing. The network connections can be wired, wireless, or a combination of wired and wireless.

In an embodiment, the device that executes the transaction manager is host device 210. In an embodiment, the transaction manager is transaction manager 215.

At 310, the transaction manager operates a base SST system 110 in a standalone mode of operation by processing self-service transactions. The base SST system 110 is resting on a horizontal surface or is mounted to a pedestal. The transaction manager utilizes a first set of peripherals associated with the base SST system 100 during the standalone mode of operation.

At 320, the transaction manager operates the base SST system 110 in an extended mode of operation by processing the self-service terminal utilizing the first set of peripherals and a second set of peripherals. The base SST system 110 is docked into an integrated peripheral device 220 or a peripheral bridge appliance 240. The second set of peripherals provided by the integrated peripheral device 220 or are made available through the peripheral bridge appliance 240.

In an embodiment, at 330, the transaction manager operates the base SST system 110 in an assisted mode of operation for processing cashier-assisted transactions. This occurs when the base SST system 110 is docked in the integrated peripheral device 220 and is pivotably rotated from an original orientation to a second orientation.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner. The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A system, comprising:
a host device;
an integrated peripheral device integrated with the host device, wherein the integrated peripheral device includes a set of peripherals and at least one host port to connect to the host device; and
a second integrated peripheral device adapted to be interfaced to the host device and removably attached from a surface associated with the host device or the integrated peripheral device;
wherein the host device is configured to be removably docked into the integrated peripheral device via the at least one host port;
wherein the host device is configured to process self-service transactions using the integrated peripheral device and the set of peripherals of the integrated peripheral device when the host device is docked into the integrated peripheral device;
wherein the second integrated peripheral device is a status display affixed to a status pole, and wherein the status pole is adapted to be removably attached to the surface associated with the host device.

2. The system of claim 1 further comprising, an accessory module adapted to be removably attached from a surface associated with the host device or the integrated peripheral device.

3. The system of claim 2, wherein the accessory module is a side shelf or one or more bag wells.

4. The system of claim 1, wherein the set of peripherals for the integrated peripheral device comprises a media dispense and acceptor, a combined card reader and keypad/Personal Identification Number (PIN) pad, a receipt printer, a media dispenser and acceptor, a coin dispenser and acceptor, and a near field communication (NFC) transceiver.

5. The system of claim 1, wherein the integrated peripheral device is a touch display.

6. The system of claim 5, wherein the set of peripherals comprises a vertical scanner and a receipt printer, and wherein a bottom of the integrated peripheral device is adapted to be placed on a horizontal surface or mounted to a pedestal.

7. The system of claim 1, wherein the host device is pivotably rotatable while docked in the integrated peripheral device between a first position in which the host device operates in a self-service mode associated with the self-service transactions and a second position in which the host device operates in a cashier-assisted mode for cashier-assisted transactions.

8. A system, comprising:
a host device; and
an integrated peripheral device integrated with the host device, wherein the integrated peripheral device includes a set of peripherals and at least one host port to connect to the host device; and
wherein the host device is configured to be removably docked into the integrated peripheral device via the at least one host port;
wherein the host device is configured to process self-service transactions using the integrated peripheral device and the set of peripherals of the integrated peripheral device when the host device is docked into the integrated peripheral device;
wherein the integrated peripheral device comprises a touch display with card reader and a bioptic scanner with weigh scale, wherein a bottom surface of the bioptic scanner with weigh scale is adapted to be placed on a horizontal surface, mounted to a pedestal, and removably docked into the integrated peripheral device.

9. The system of claim 8 further comprising a second integrated peripheral device is adapted to be interfaced to the host device and removably attached from a surface associated with the host device or the integrated peripheral device.

10. The system of claim 8, further comprising, a second integrated peripheral device, wherein the second integrated peripheral device is a bag well with an integrated weigh scale attached to the integrated peripheral device via a surface.

11. The system of claim 8, wherein the bottom surface of the bioptic scanner with weigh scale is further adapted to be docked to a peripheral bridge appliance to connect the host device to additional peripherals when the host device is undocked from the integrated peripheral device.

\* \* \* \* \*